United States Patent

[11] 3,618,057

| [72] | Inventor | Arthur J. Bromley<br>Lauderdale-By-The-Sea, Fla. |
|---|---|---|
| [21] | Appl. No. | 827,565 |
| [22] | Filed | May 26, 1969 |
| [45] | Patented | Nov. 2, 1971 |
| [73] | Assignee | McGraw-Edison Company |

[54] INSTRUMENT HAVING READOUT TAPE DRIVEN BY TWIN TORQUE RECEIVERS
11 Claims, 8 Drawing Figs.

[52] U.S. Cl. .................................................. 340/198,
340/315, 318/6, 242/75.51
[51] Int. Cl. ................................................. G08c 19/00
[50] Field of Search........................................... 340/198,
315, 316, 317, 318, 319; 116/124, 129; 318/6, 7,
23; 40/31; 242/75, 75.5, 75.51

[56] References Cited
UNITED STATES PATENTS

| 2,477,673 | 8/1949 | Weisman................. | 340/198 |
| 2,754,605 | 8/1956 | Berkeley ................. | 40/31 |
| 2,804,041 | 8/1957 | Neugass .................. | 340/198 |
| 3,039,032 | 6/1962 | Fowler .................... | 340/198 |
| 3,307,165 | 2/1967 | Sharp et al............... | 340/198 |
| 3,381,656 | 5/1968 | Ohnikian et al. ......... | 116/129 |
| 3,458,155 | 7/1969 | Planteijdt................. | 226/42 |

Primary Examiner—John W. Caldwell
Assistant Examiner—Robert J. Mooney
Attorney—George H. Fritzinger ABSTRACT: An electrical instrument of the readout tape type comprises two synchro torque receiver units arranged to drive two reels in unison with a readout tape supported by the two reels and adapted to move in indicating relationship with a calibrated scale. The two torque receivers are mechanically interconnected by the tape so that the rotors are angularly displaced from their null positions to tension the tape with a constant force regardless of the angular input signal. A solenoid-operated synchronizing device resets the torque receivers to a midpoint of travel when the synchro system is deenergized. Also, gears may be provided between the two rotor shafts to retain the relative positions of the rotors and prevent unwinding of the tape when the synchro system has been deenergized.

Inventor:
Arthur J. Bromley
By
Neil M. Rose
Atty

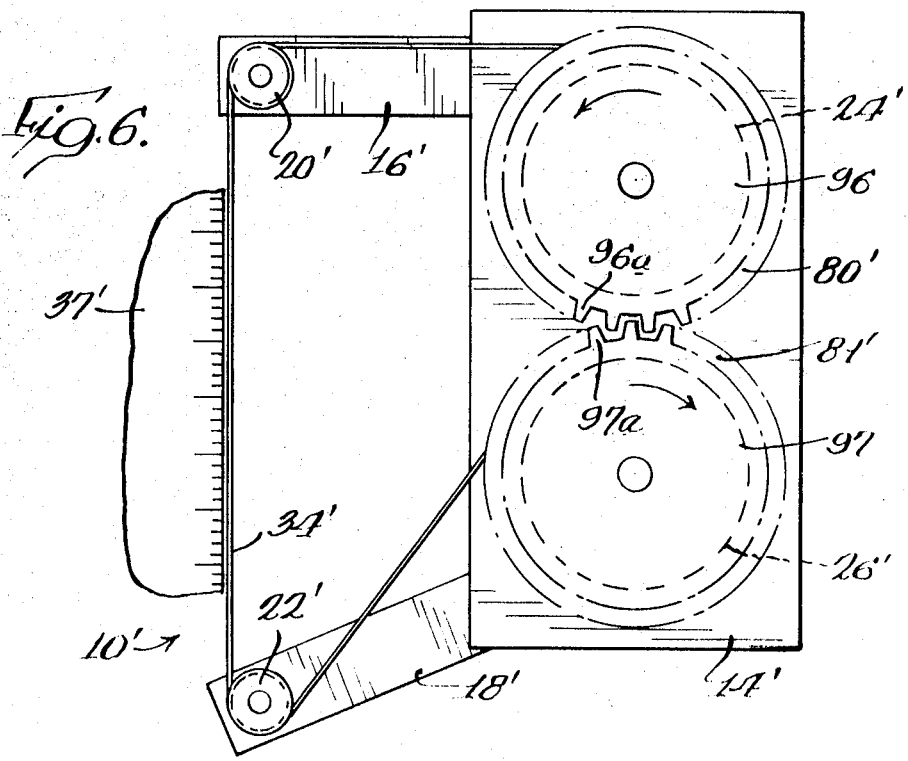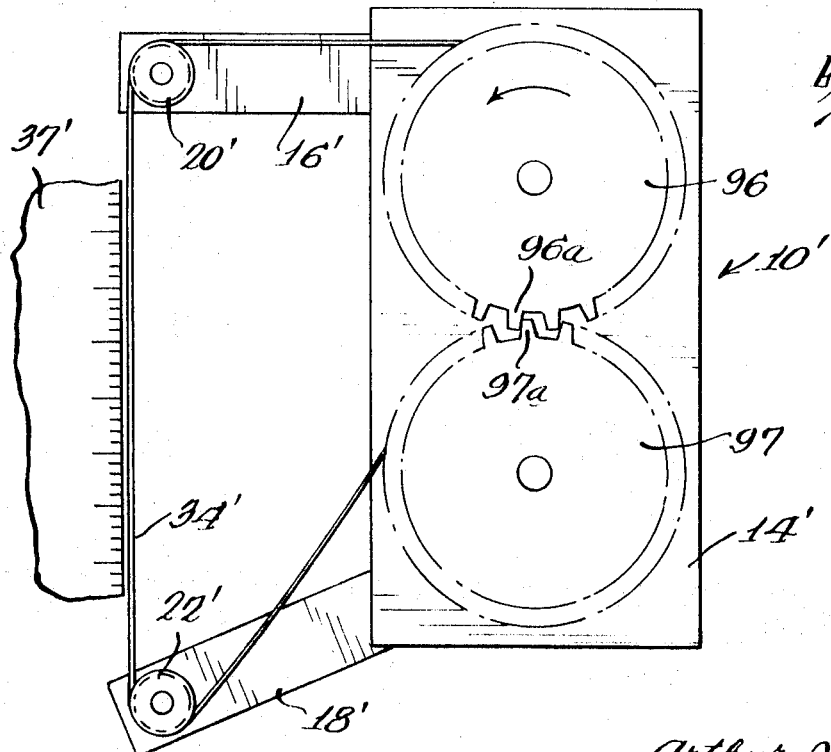

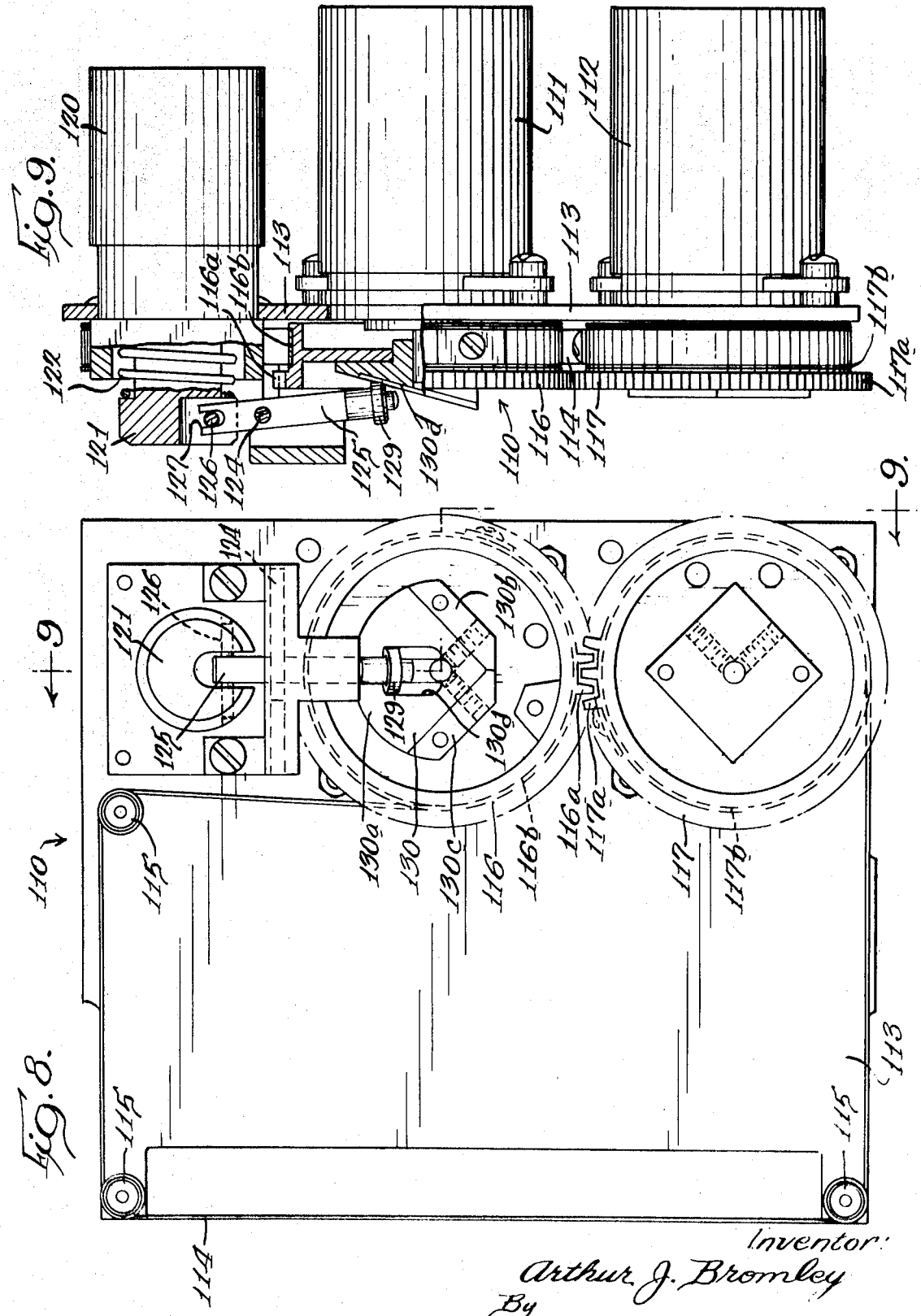

INSTRUMENT HAVING READOUT TAPE DRIVEN BY TWIN TORQUE RECEIVERS

BACKGROUND OF THE INVENTION

In recent years, there has been much discussion as to the advantages of circular dial instruments as compared to linear or vertical scale-tape-type instruments. The vertical scale-tape-type instrument has a definite advantage when a pilot or operator is called upon to compare a number of instrument readings with each other; as for instance, the pressure, temperature, or rotor speed of a number of engines in a jet aircraft. With the vertical scale display, not only is the comparison of adjacent readings facilitated, but the fact that the length of a white or colored indicia column in the instrument signifies a certain reading or quantity makes it much easier for the pilot to obtain a feeling or impression of the instrument reading quickly with a minimum of metal concentration. Because of the greater ease of readability in the vertical scale-tape-type instrument, it would undoubtedly be used in more applications if it were not for the high cost in comparison to the simple round dial indicator type of instrument.

The rotary instrument in many instances will utilize a synchroreceiver which directly supports the indicator needle for rotation with respect to a circular dial. There is no friction to overcome or power required by the synchroreceiver other than to support and rotate the indicator needle which, if properly balanced and of light weight, requires almost no power. In contrast, the tape-type instrument comprises an elongated indicia bearing tape which must be mounted between a pair of supporting reels or rollers and must include means for tensioning the tape. In order to position the tape in response to a remote reading or condition, it is necessary to drive the tape with some device having sufficient power to overcome the frictional forces which are inevitably associated with the two supporting reels and whatever means is used to tension the tape on the reels. The force required to position the tape is so high as to almost preclude the use of a synchrotorque receiver. The synchrotorque receiver is inherently a very low power device, and in an instrument application, any power which the receiver is required to deliver tends to induce an error in the reading of an instrument.

In connection with the tensioning means utilized in tape-type instruments, it is noted that springs are generally employed to properly tension the tape. Although springs do provide an adequate tensioning force, their use not only introduces additional power as discussed above but also an objectionable variable error into the reading of the tape instrument. It is difficult and expensive to provide spring-tensioning means that will provide a completely uniform tension in all positions and directions of movement of the tape. This invention relates to a system for driving a tape by synchrotorque receiver without introducing any appreciable error into the reading by providing a constant, near frictionless tensioning means which operates uniformly throughout the range of travel of the readout tape.

SUMMARY OF THE INVENTION

The invention relates to a system for tensioning the readout tape of an electrical instrument and, more particularly, relates to a system for tensioning the readout tape that is driven by a synchrotorque receiver.

In the electrical instrument of this invention, the opposite ends of a readout tape are attached to a reel, and each reel is driven by a synchrotorque receiver unit. The two synchrotorque receiver units are electrically connected in parallel and are electrically "preloaded" to tension the tape with a constant force for all angular positions of the synchroreceiver unit's rotors. Preloading is accomplished by offsetting in opposite directions by an equal amount the field windings of both receiver units with respect to the physical angular orientation of the synchrotransmitter's field windings. This, in actual practice, is accomplished by offsetting one synchro to twice the desired amount and the "division by two" being accomplished automatically by the pair due to the similar or identical torque gradient. The rotors of the torque receivers are maintained in their preloaded or offset relationship by the tape which is interconnected between the two reels supported on the rotor shafts. The tensioning force created by each of the rotors being angularly displaced in opposite directions away from their null positions is equal and opposite and results in the tape being under constant tension and being accurately positioned in response to the orientation of the synchrotransmitter. Since the two synchrotorque receiver units are connected in parallel, the movement of the synchrotorque transmitter's rotor will cause the rotors of both synchrotorque receivers to follow in unison while maintaining their relative offset orientation with respect to each other as a consequence of the interconnection by the tape. The result of this arrangement is to provide a uniform and frictionless tensioning means for the readout tape.

Another feature of this invention is a reset device to rotate the rotors of both synchrotorque receivers to a "reset position" upon the removal of electrical power to the synchrosystem. This reset means is needed in all cases where the required or input signal rotational angle might exceed 180°. In addition, the synchronizing means is also necessary in any cases in which the tape might tend to unwind or be displaced with respect to the supporting reels or rollers. When the instrument is deenergized, there will no longer be a tension applied to the tape by virtue of the torque produced from the synchroreceiver rotors. Accordingly, the tape might become slack and cause problems in maintaining its properly positioned location in the instrument. As far as the importance of the 180° rotational angle is concerned, it should be evident that if the torque receivers moved in a direction other than that which would take up the slack in the tape upon energization, the two torque receivers would not tension the tape, and their rotors would not be held in their displaced positions by the taut connection of the tape. As a consequence, the reset position is selected so that at the time the system is energized, the maximum rotation of the synchroreceiver's rotor is less than 180° in either direction to align with the synchrotransmitter's rotor orientation.

The reset device includes a reset cam mounted on each reel for cooperation with a return mechanism to reset the synchroreceiver's rotor to a selected angular position. When power is removed from the synchrosystem, a spring-loaded solenoid is deenergized which pulls a plunger assembly toward the reset cams. Two ball bearing roller cam members that are carried by the plunger assembly are moved into driving engagement with reset cams and rotate the synchroreceiver's rotors to the starting position. The reset device does not add any objectionable frictional forces when the system is operating since no physical contact is made by the plunger assembly and the reset cams while the synchrosystem is energized.

An alternative embodiment of the reset device includes the use of gearing between the rotor shafts of the two synchrotorque receivers. When using the gearing to synchronize the movement of the rotor shafts, the solenoid reset need only act on one of the rotors since the other will follow because of the geared connection. To permit the use of such geared connections between the synchroreceivers, it was necessary to modify the direction in which the indicating tape wound on one of the take up drums so that the synchroreceiver would rotate in opposite directions at any instant thereby permitting the direct geared connection. The gearing utilized in this embodiment has widely spaced teeth so that under energized conditions, the two synchrotorque receivers and the interconnecting tape will cause the synchrorotors to rotate in an accurately synchronized manner with the gear teeth out of engagement with each other. When the synchrosystem is deenergized, however, the gear teeth will then engage and will permit the tape to slack off a very small amount. When the system is reenergized, the synchroreceiver rotors will again move to their displaced positions causing the tape to again be tensioned and the gear teeth to disengage from each other. Depending on the amount of travel permitted in the synchrorotors as explained above, the reset solenoid mechanism may or may not be required. If it is required, however, it need operate on only one rotor and through a single cam because of the geared connection.

An object of this invention is to provide an improved, linear reading-tape-type instrument which utilizes a synchroreceiver drive means.

Another object of this invention is to provide an improved, linear reading-tape-type instrument utilizing a pair of synchroreceivers connected in parallel to tension and position a readout tape in response to a synchrotransmitter signal.

Still a further object of the present invention is to provide a novel tape-type instrument having the tape supported by the output shafts of synchroreceiver units and having the rotors of said units electrically displaced from their null positions in opposite directions to tension the tape.

Another object of this invention is to provide a substantially frictionless constant tension force on a readout tape that is driven by synchroreceiver means.

A further object of this invention is to provide an improved tape-type instrument having two synchroreceivers for supporting and driving the tape and having a device for resetting and synchronizing the mechanical orientation of the two synchroreceiver rotors upon the synchrosystem being deenergized.

BRIEF DESCRIPTION OF THE DRAWINGS

For a better understanding of the present invention, reference may be had to the accompanying drawings in which:

FIG. 4 is an enlarged fragmentary view of the synchronizing device for the instrument as seen from the line 5–5 of FIG. 5.

FIG. 5 is a fragmentary side elevational view of the tape instrument shown in FIG. 1;

FIG. 6 is a diagrammatic view of an alternative embodiment of the synchronizing device;

FIG. 7 is a diagrammatic showing of a portion of the synchronizing device of FIG. 6 when in the deenergized condition;

FIG. 8 is a side elevational view of a second alternative embodiment of my invention; and FIG. 9 is a sectional view taken on line 9—9 of FIG. 8.

DESCRIPTION OF THE PREFERRED EMBODIMENTS

Figure 1:
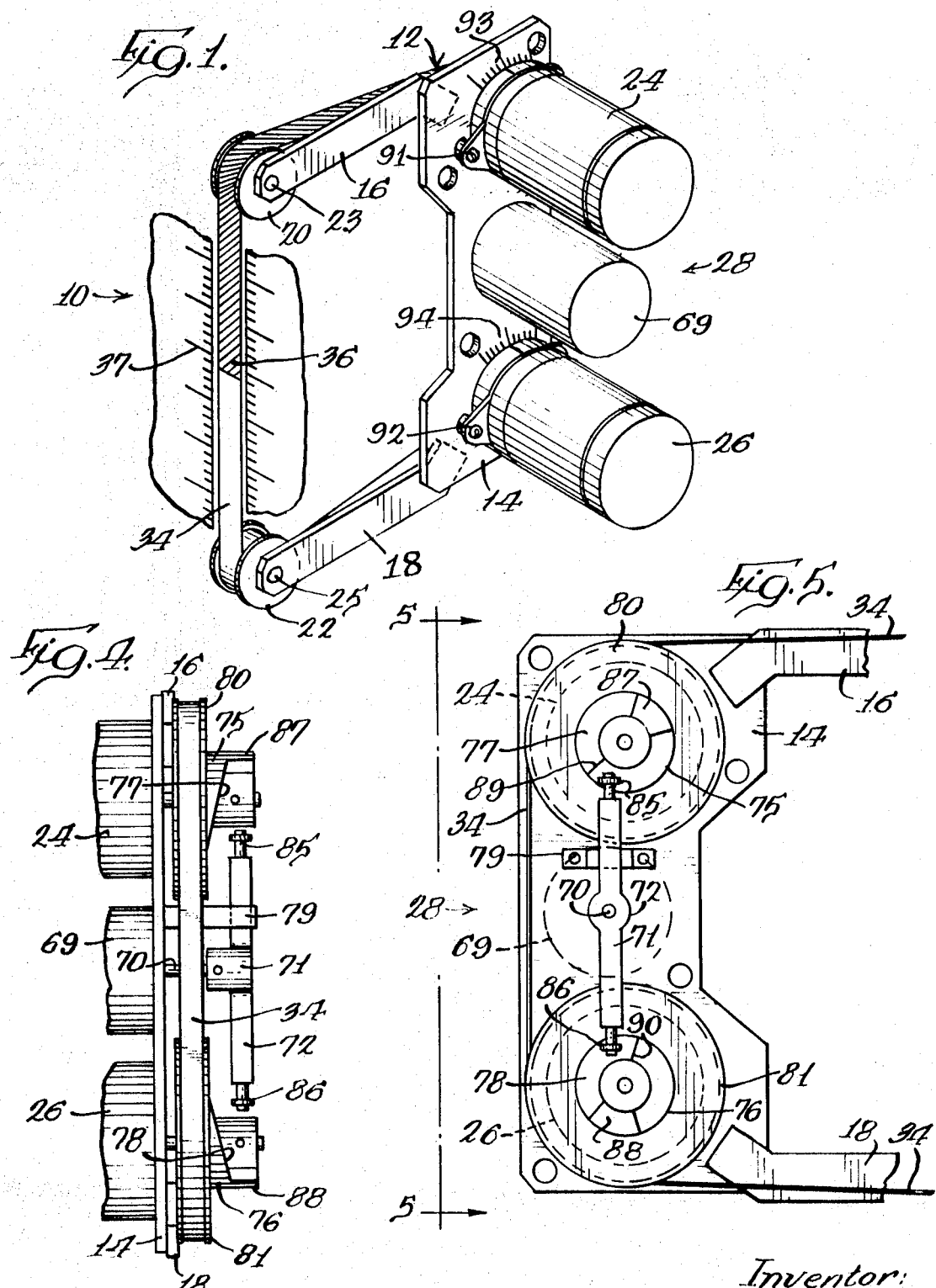
FIG. 1 is a perspective view of a tape-type instrument that embodies the principles of the present invention.

There is shown in FIG. 1 a linear tape-type instrument 10 having a frame member 12 which consists of a support plate 14 and two arm members 16 and 18 that extend forwardly from support plate 14. Mounted at the forward end of arm members 16 and 18 are two idler rollers 20 and 22, respectively. To prevent any frictional errors from being introduced by the idler rollers 20 and 22, it is preferred that jewel or ball bearings 23 and 25 be used to mount rollers 20 and 22, respectively, to arm members 16 and 18.

Mounted on the outside edges of support plate 14 are synchrotorque receiver units 24 and 26, and disposed between the synchroreceiver units 24 and 26 is a synchronizing synchrosystem 28. The synchronizing device 28 functions to reset and synchronize the synchrotorque receiver units 24 and 26 when the synchrosystem is deenergized, as will be explained in detail below.

It is well known in the art to utilize a synchroreceiver in conjunction with a synchrotransmitter to indicate at a remote location the angular orientation of the synchrotransmitter's rotor. When the two devices are properly connected, the rotor of the synchroreceiver follows the angular movement of the transmitter's rotor. In order to visually indicate the angular position of the transmitter's rotor, the synchro's rotor is frequently associated with some type of display or indicating means such as an indicating pointer which is positioned to cooperate with a calibrated scale. The nature of a synchroreceiver is such that any indicating means associated with the rotor must consume very little power or there will be introduced a significant error into the reading produced. As may be readily appreciated by one skilled in the art, the synchrotransmitter is a type of rotary transformer which produces an electrical signal indicative of the rotor position. This electrical signal, when applied to the rotor of the synchroreceiver, causes the receiver rotor to align itself with the magnetic field created by the field members so that the receiver rotor moves in accordance with the transmitter rotor position. The only time it is possible to produce torque in the synchroreceiver rotor is when the rotor is displaced or not aligned with the magnetic field. It is obvious, therefore, that the synchroreceiver will not operate properly as an instrument indicating the position of the remote transmitter rotor if any appreciable amount of torque is required to position the indicator connected to the rotor of the synchroreceiver. The error in the rotor position will be proportional to the load which it must deliver. Accordingly, it has been impractical to directly power a tape-type indicator with a synchroreceiver. Instead, a more expensive servomechanism is generally used to power the indicator and sense the proper positioning thereof.

In the instrument 10, a pair of synchroreceiver units 24 and 26 are utilized to drive and tension a readout tape 34 in such a way that the errors associated with friction and torque in prior art synchroinstruments have been eliminated. As is illustrated in FIG. 1, the synchroreceivers 24 and 26 are mounted at spaced locations on the support plate 14 and are drivingly connected to the readout tape 34. For the purpose of providing a visual indication or reading, the tape 34 is fabricated with an indicating portion 36 which may consist merely of a colored or textured portion which contrasts with the remainder of the tape 34 and permits the operator to quickly observe the reading provided by the instrument 10.

The instrument 10 is designed to fit as a complete unit in the instrument panel of an aircraft or other vehicle such that indicating portion 36 of readout tape 34 will move in indicating relationship with a calibrated scale 37. In most applications, there will be a number of such tape instruments arranged in close proximity so that the readout tape 34 may be seen at a glance, and if appropriate, be compared with each other. It is for this reason that tape 34 is shown mounted by means of the idler rollers 20 and 22 rather than mounted directly on drums carried by the output shafts of the synchrotorque receivers. It should be understood, however, that in its simplest form where multiple display and position of the instrument with respect to a control panel is not a limiting factor, the tape 34 could be supported directly on drums or pulley wheels carried by the output shafts of the synchroreceivers 24 and 26.

Figure 2:
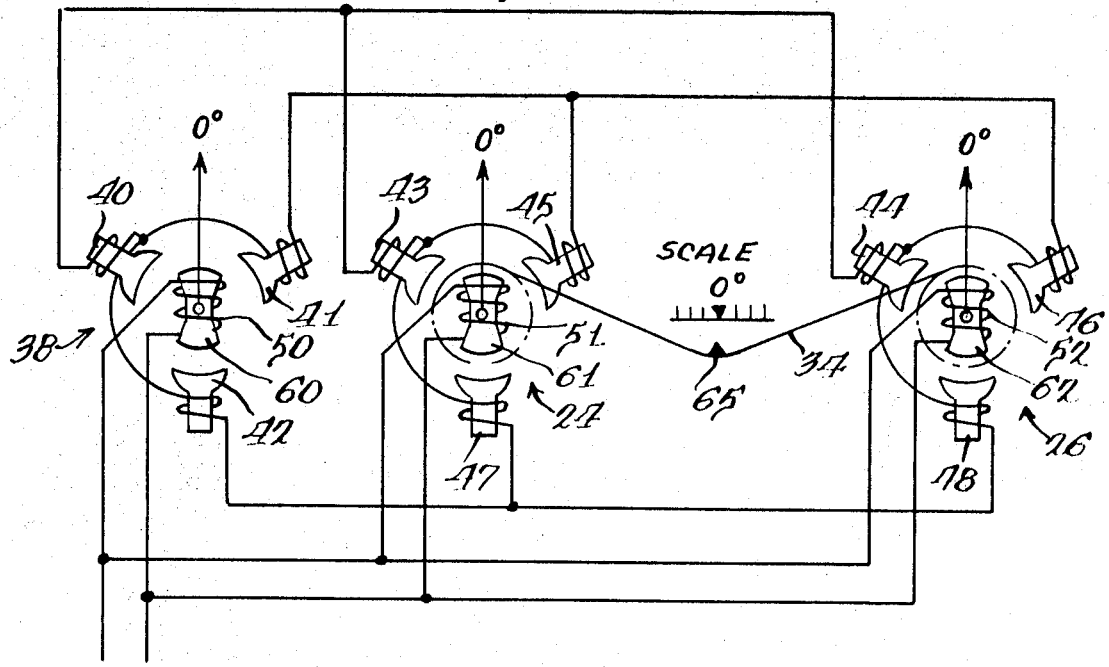
FIG. 2 is a schematic diagram of the synchrosystem part of which is illustrated in the instrument shown in FIG. 1.

As previously discussed, one of the problems of a tape instrument is to maintain a tautness in the readout tape without introducing spring forces and friction which in turn would cause intolerable errors in the reading of the instrument. This invention solves this problem by utilizing the synchroreceivers to apply a pulling forces at the opposite ends of the readout tape. Since the tape-tensioning forces are in opposite directions and provided by the synchrodrive mechanism itself, the friction and tension problems presented in the prior art are eliminated. To illustrate the manner in which the synchrosystem is connected, reference may be had to the schematic diagram of FIG. 2 Synchroreceiver units 24 and 26 are provided with field windings 43, 45, 47, and 44, 46, 48, respectively, which are electrically connected to the field windings of a synchrotransmitter unit 38 such that the field windings having the same physical orientation are connected in parallel. By this arrangement, the rotors of the receivers 24 and 26 will rotate together in the same direction. Thus, in FIG. 2, the transmitter unit 38 is shown having transmitter windings 40, 41 and 42 which are connected, respectively, to synchroreceiver winding pairs 43-44, 45-46, and 47-48. The transmitter 38 also includes a rotor winding 50 supported on rotor 60 while receivers 24 and 26 include rotor windings 51 and 52, respectively, supported on rotors 61 and 62. As is evident from FIG. 2, the rotor windings 50, 51, and 52 are connected in parallel to an input power supply through lines 55-56. When synchroreceivers 24 and 26 are connected to synchrotransmitter 38 in this manner, their rotors 61 and 62, respectively, will follow any angular movement of transmitter's rotor 60, and consequently, the receiver rotors 61 and 62 are rotated in unison. If the ends of a readout tape 34 are driven by receiver rotors 61 and 62, as shown in FIG. 2, its indicator 65 could be arranged to move along a calibrated scale 37 to indicate the angular position of the transmitter rotor 60. In FIG. 2, the rotors 61 and 62 are considered to be in their null positions corresponding to the position of transmitter rotor 60 and tape 34 is shown in slack condition.

Figure 3:
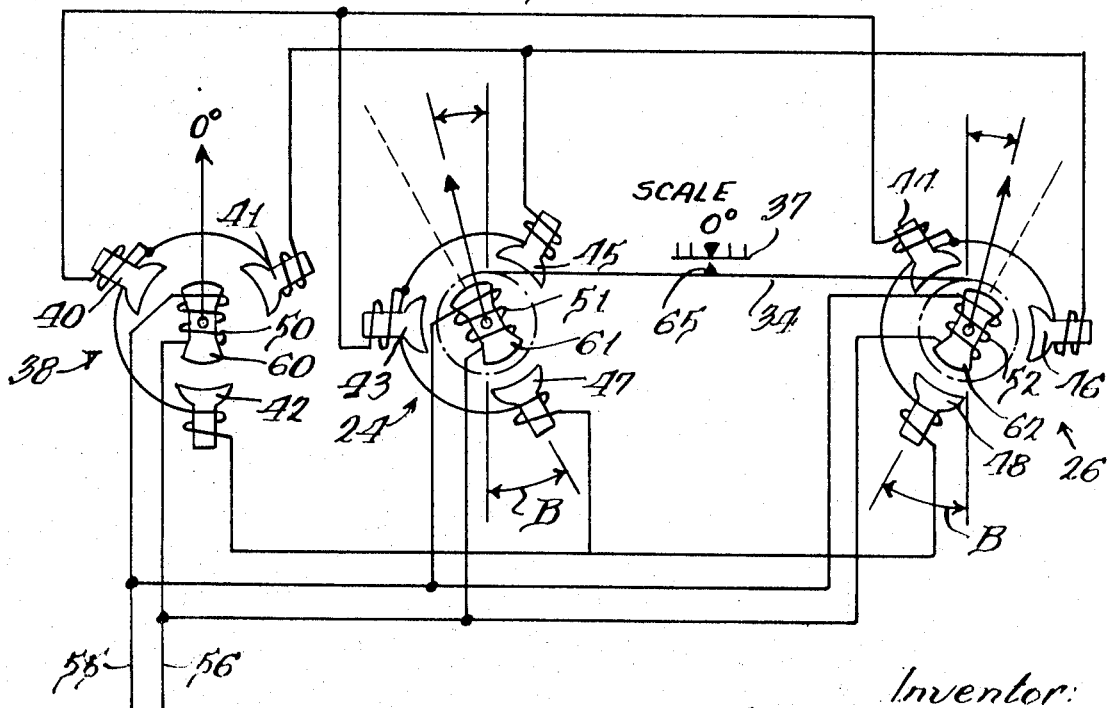
FIG. 3 is a schematic diagram similar to FIG. 2 but with the synchrotorque receivers positioned to tension the tape.

To provide the necessary constant tension in readout tape 34, synchroreceiver units 24 and 26 are electrically preloaded by connecting the tape 34 in such a way that it displaces the rotors toward each other from their position aligned with their magnetic fields as is illustrated in FIG. 3. To illustrate schematically the manner in which the tape 34 is tensioned, the fields of torque receivers 24 and 26 are shown in Fig. 3 rotated 30° in opposite directions from their positions in Fig. 2. The first half of this field displacement causes the rotors 61 and 62 to take up the slack in tape 34, and during the further displacement, the field is displaced relative to the rotor since the rotor is restained from further rotation by the tape 34. This results in the rotors 61 and 62 being displaced from their null positions with respect to their respective fields thereby producing a torque which tensions tape 34. Although a number of methods could be used to connect the tape so that it would hold the rotors 61 and 62 in the displaced positions described, the method of rotating in equal amounts but in opposite directions the housing and field windings of synchroreceiver units 24 and 26 through a small angle is a simple means of achieving the displaced or preloaded condition of the rotors. Since the system will be self-adjusting to equalize the tensioning torque produced by each rotor, the desired result could also be accomplished by merely rotating one housing and field through a selected angle but a recalibration of the indicator 65 and scale 37 would then be required.

By rotating both synchroreceiver housings and fields as shown in FIG. 3, the slack in the tape is taken up in both directions leaving indicator 65 properly oriented with the scale 37. The required angle of displacement to achieve the desired tape tension will vary with the torque gradient of the synchrotorque receiver. As depicted in FIG. 2, the rotors 61 and 62 will be rotated from their true null position with respect to the angular position of transmitter rotor 60 by an equal amount. As transmitter rotor 60 is turned, rotors 61 and 62 will follow without change in the amount of the angular offset from their true nulls. Thus, an equal pull is exerted on each end of tape 34 for all its positions of travel, and the indicator 65 carried by tape 34 will be positioned accurately with respect to scale 37 to give a substantially error free reading of the position of rotor 60. Although the electrical preloading of synchrotorque receiver units 24 and 26 adds an internal friction during operation, these frictional forces do not cause any appreciable error in the instrument reading.

By virtue of the displaced position of the rotors 61 and 62 from their null or field aligned positions, there is sufficient torque produced in each of the torque receivers 24 and 26 to adequately tension the tape 34 and still overcome the minor frictional forces which will be present in the system. These frictional forces principally associated with the bearings in the synchroreceivers 24 and 26 will have little effect on the accuracy of the instrument 10. By balancing the two receivers 24 and 26 against each other to cancel out the displacement error which accounts for the tape tensioning torque, I have provided a low-cost tape-type instrument which is characterized by much greater accuracy than any prior art devices of comparable simplicity.

There are other possible arrangements of using twin torque synchroreceivers to drive a readout tape. One such arrangement is to use an endless belt supported by the twin torque receivers and employ an independent-tensioning means. The errors arising in each receiver caused by the tensioning force would tend to cancel out and thereby produce an accurate reading.

When the rotational angle of torque receiver units 24 and 26 might exceed 180°, it is necessary to reset and synchronize the rotors 61 and 62 when the system is deenergized. The reset position may be arbitrarily selected as the midpoint of travel so as to minimize angular travel between the limits of travel and the reset position. With the reset so located, it is possible to operate the instrument over almost the full 360° range of rotor 60 since the position of transmitter rotor 60 may be just less than 180° in either direction from the reset position at the time the synchrosystem is again turned on and the receiver rotors will operate in the same and proper direction to maintain the tape tension and the displaced relationship of the rotors to their respective fields. One of the requirements of a reset and synchronizing device is not to add any frictional effects on the synchros while the system is energized. To meet this requirement, the reset device 28 has a solenoid 69 that is electrically connected (not shown) to the input power lines 55 and 56.

To understand the reset device 28, reference should be made to FIGS. 4 and 5 where the positions of its parts are shown with the synchrosystem of FIGS. 2 and 3 energized. The solenoid 69 is of conventional form having a cylindrical field member and an axially reciprocating armature, both of which are not shown. The armature is supported on a shaft 70 which is guided for axial movement when the armature moves between the energized and the deenergized positions. Connected to the upper end of the armature shaft, as shown in FIG. 4, is a transversely extending cam follower member 71 which together with the shaft 70 forms a T-shaped plunger assembly 72. The plunger assembly 72 is spring biased inwardly toward plate 14, and in FIG. 4 is shown in the elevated position which it assumes when the solenoid 69 is actuated.

As a part of the reset device 28, there are provided helical cams 75 and 76 which are mounted on the outer ends of the output or rotor shafts of the synchros 24 and 26, respectively. For convenience of fabrication, the cams 75 and 76 may each be secured to a reel or tape-supporting drum 80 or 81 which is also supported on each of the synchrorotor shafts. It should be understood that the drums 80 and 81 are connected to the ends of the tape 34, and it is through this connection that the offset position of the rotors with respect to the electrical fields are maintained during operation. The cams 75 and 76 include annular, sloping cam surfaces 77 and 78, respectively, each of which slopes upwardly from low points 89 and 90, respectively, each of which slopes upwardly from low points 89 and 90, respectively, in opposite directions toward the wedge-shaped stop member 87 and 88, respectively. To guide the movement of plunger assembly 72 between its upper and lower position, there is provided a guide member 79 which prevents swinging movement of follower member 71 about the shaft 70.

For the purpose of interconnecting the solenoid mechanism with the cams 75 and 76, the cam follower member 71 is provided with rollers 85 and 86 on the outer extremities thereof. The rollers 85 and 86 are positioned to rotate about a common axis which extends lengthwise of member 71 and are adapted to travel in engagement with the sloping surfaces 77 and 78. When the solenoid 69 is deenergized along with the rest of the synchrosystem, the plunger assembly 72 moves downwardly from the position shown in FIG. 3 under spring force as was stated above to a position in which the cam follower rollers 85 and 86 engage the sloping cam surfaces 77 and 78. The spring force transmitted through the plunger assembly to the rollers 85 and 86 causes the cams 75 and 76 to be rotated until such time as the rollers 85 and 86 reach the lowermost points 89 and 90 on the cams 75 and 76. The result is that the reset device 28 causes the cams 75 and 76 and their related synchrorotors to rotate to a central position with respect to the total amount of travel between the stops 87 and 88.

The reset device 28 and its associated cam structure serves to maintain tension on the tape 34 from immediately following deenergization of the synchrosystem until the time when it is reenergized. In the deenergized condition, the solenoid 69 causes the cams 75 and 76 to maintain the tension on tape 34 while at the same time rotating the rotors of synchros 24 and 26 to a predetermined position in which the cam points 89 and 90 are aligned with the cam follower member 71. By maintaining this continuous tension on the tape 34 and by moving the rotors to the center of their possible amount of travel, the instrument 10 may be turned on and off without causing any malfunctioning as a consequence of the slackening or unwinding of the tape 34 during periods of deenergization or misalignment of the rotors at the time they are reenergized.

In order to introduce the rotor displacement described above in connection with the schematic diagram of FIGS. 2 and 3, means are provided to rotate the field with respect to the rotor after the rotors have been interconnected through reels 80 and 81 by tape 34 and the rotors 60 and 62 positioned in their null or aligned positions with respect to their respective fields. The synchros 24 and 26 are mounted in the conventional manner including adjustment screws 91 and 92, respectively, which may be loosened to permit the synchros to be rotated with respect to the supporting plate 14. Suitable graduations 93 and 94 may be provided to facilitate the establishment of the desired displaced positions of the fields with respect to the rotors. As may be readily understood, many other means may be used such as means for adjustment of the reels or takeup drums 80 and 81 and the interconnection of the tape 34 to establish the displaced relationship between the rotor and field in each of the synchros 24 and 26.

In FIGS. 6 and 7 of the drawings, there is shown an alternative solution to the problem of synchronizing the synchrotorque receivers 24 and 26 in their deenergized condition to prevent unwinding or slackening of the tape. To illustrate this alternative embodiment, there is shown an instrument 10′ including synchrotorque receivers 24′ and 26′ electrically connected to a synchrotransmitter in the same manner as is illustrated in FIGS. 3 and 4. The synchrotorque receivers 24′ and 26′ are mounted on a support plate 14′ from which a pair of arm members 16′ and 18′ extend. Idler rollers 20′ and 22′ are mounted at the outer ends of the arm members 16′ and 18′. The rotor shafts of the synchrotorque receivers 24′ and 26′ have mounted on their exposed ends takeup rollers or drums 80′ and 81′, respectively. A readout tape 34′ is connected at its opposite ends to the drums 80′, 81′ and extends around the rollers 20′ and 22′. As in the embodiment of FIGS. 1 to 5, the tape 34′ is arranged to maintain the rotors of the synchrotorque receivers 24′ and 26′ in their preloaded or displaced positions as is described in detail above. It should be noted that the manner in which the tape 34′ in the embodiment of FIGS. 6 and 7 winds on the drum of the synchrotorque receiver 26′ is arranged differently from the embodiment of FIGS. 1 to 5 so that the rotors of the two synchrotorque receivers are always rotating in the opposite directions at any instant.

Also mounted on the shafts of the torque receivers 24′ and 26′ are synchronizing gears 96 and 97. The gears are provided with widely spaced, intermeshing teeth 96a and 97a. At the time the initial preloading or displacing of the rotors with respect to the null positions is done, the synchronizing gears 96 and 97 are positioned so that the gear teeth 96a and 97a overlap each other but do not touch as is best shown in FIG. 6. The tape tension which is maintained by the preloading positioning of the rotors permits the synchrotorque receivers 24′ and 26′ to rotate continuously with the gear teeth in the spaced relation as shown in FIG. 6.

As soon as the synchrosystem is deenergized, the synchrorotors release their tensioning forces on the tape 34, and the tape begins to slacken up as is shown in a somewhat exaggerated manner in FIG. 7. The interengagement of the gears 96 and 97, however, permits only a slight slackening of the tape before the gear teeth 96a and 97a move into engagement thereby preventing any further relative rotation between the drums 80′ and 81′. It is evident, therefore, that the synchronizing gears 96 and 97 maintain the relative positioning of the synchrotorque receivers 24′ and 26′ during periods in which the instrument is deenergized. In the energized condition of the synchrosystem, however, the synchronizing gears 96 and 97 move into a disengaged relationship by virtue of the spacing of the teeth 96a and 97a and the orientation of the teeth so that the teeth on each gear overlap but do not engage the teeth on the other gear. Thus, the synchronizing gears 96 and 97 introduce no friction or drag on the instrument during periods of operation.

The embodiment of FIGS. 6 and 7 includes means for synchronizing the movement of the rotors 61 and 62 but has no mechanism equivalent to the reset mechanism 28 of the embodiment of FIGS. 1 to 5. As has been previously explained, the reset mechanism is necessary only when the range or amount of travel permissible in the rotors of the synchrotransmitter and synchroreceiver is such that there is a possibility of the synchroreceivers being located in a position such that upon receiving an initial signal from the synchrotransmitter they might rotate in the wrong direction to the aligned position. The mechanism 28 including solenoid 69, plunger assembly 72, and the cams 75 and 76 performs both a resetting and a synchronizing function. It has been found, however, that delays in the operation of the solenoid 69 may result in temporary slackening of the tape 34. The use of the interengaging gears 96 and 97 disclosed in connection with the embodiment of FIGS. 6 and 7 provide a more positive synchronizing means which eliminates any possibility of the tape 34′ slackening to such an extent that it might become disengaged from the supporting rollers.

In situations in which the geared type of synchronizing device, as shown in FIGS. 6 and 7, is to be used along with a solenoid-operated reset mechanism, it is possible to simplify the solenoid mechanism so that it operates on only one of the synchroreceivers. To illustrate this type of arrangement, there is shown in FIGS. 8 and 9 a further embodiment of my invention comprising an instrument 110 having synchroreceivers 111 and 112 which are supported on a frame member 113. The synchroreceivers 111 and 112 are drivingly connected to an indicating tape 114 which has indicating means and a cooperating scale not shown as did the embodiments of FIGS. 1 to 5 and 6 and 7. The tape 114 extends around idler rollers 115 which rollers are supported on the frame member 113. Secured to the outwardly extending rotor shafts of the synchroreceivers 111 and 112 are rollers or drums 116 and 117, respectively, which are formed on their peripheral portions with gear teeth 116a and 117a, respectively, In addition, adjacent the toothed portions 116a and 117a, the rollers 116 and 117 are formed with annular surfaces 116b and 117b to which the ends of the tape 114 are secured and on which the tape is reeled up as the synchroreceivers rotate and receive the tape thereon.

The synchroreceivers 111 and 112 are connected to the synchroreceiver in the manner disclosed in the schematic diagrams of FIGS. 2 and 3, and the tape 114 is connected to the rollers 116 and 117 in such a manner as to obtain the displacement of the synchroreceiver rotors from the null positions in order that a torque is produced to tension the tape 114. Similarly, this connection is adjusted so that the gear teeth 116a and 117a are spaced and out of engagement when the synchrosystem is energized and the tape 114 is under tension as provided by the displacement position of the synchroreceiver rotors.

In order to reset the rotors of the synchroreceivers 111 and 112 to their center positions of travel, there is provided a solenoid 120 which is connected in the same manner as the solenoid 69 of the embodiment of FIGS. 1 to 5 so that the solenoid is energized when the synchrosystem itself is energized. As shown in Fig. 9, the solenoid 120 includes an armature shaft 121 which is guided for axial reciprocating movement and is biased outwardly by a helical spring 122. Extending from the housing of the solenoid 120 is a yoke 123 which includes a pin 124 on which a lever member 126 is supported for pivotal movement. The inner end of the lever 125 is pivotally related to the armature shaft 121 by means of a pin 126 carried by the armature shaft 121 and a slot 127 formed in the end of the lever 125. As the armature shaft 121 is caused to reciprocate by electrical energization which causes the shaft to move inwardly or deenergize which causes the spring 122 to bias the shaft outwardly, the lever 125 is pivoted about pin 124.

The outer end of the lever 125 has a cam follower roller 129 which is supported thereon to rotate about an axis extending lengthwise of the lever 125. The roller 116 carried by the shaft of synchroreceiver 111 is provided with a sloping cam member 130 which is positioned centrally of the rollers 116 and rotates therewith. The cam follower roller 129 is adapted to engage the periphery of the cam 130 and cause the roller 116 and the rotor of the synchroreceiver 111 to rotate to a reset position. The reset position is, of course, located centrally with respect to the range of travel of the roller 116.

The cam 130 has been constructed so as to be simple to fabricate and still perform the necessary reset function. The cam 130 consists of a plug having a first sloping surface 130a and two other angled surfaces 130b and 130c. These surfaces 130a, 130b, and 130c are simple, flat planes and approximate the helical cam surfaces 77 and 78 shown in connection with the embodiment of FIGS. 1 to 5. At the reset position, the surface 130a is provided with a V-grooved recess 130d which receives the cam follower roller 129 in the reset position. The recess 130d is utilized rather than merely relying on the cam follower roller 129 seeking the low point in the cam surface since otherwise there would be some overshoot and hunting before the rotor of synchroreceiver 111 would come to rest. As shown in FIG. 9 of the drawings, the solenoid 120 and the synchrosystem has been deenergized thereby permitting the helical spring 122 to bias the armature shaft 121 outwardly resulting in the lever 125 pivoting the cam following roller 120 into resetting engagement with the cam 130. This pressure applied to the cam 130 causes the rotor of synchroreceiver 111 to move to the reset position.

By virtue of the interengagement between the rollers 116 and 117 through the teeth 116a and 117a, the rotor of the second synchroreceiver 112 is also caused to move to the reset position along with the rotor of synchroreceiver 111. This arrangement provides a very high reliability instrument which will respond quickly and accurately to a new signal following deenergization and which will completely eliminate any possibilities of malfunctions due to slackening of the tape 114 or ambiguities as a result of the improper directional rotation of the rotors of synchros 111 and 112. It should also be appreciated that the reset and synchronizing mechanisms associated with the instrument 111 are such that they provide no drag or load on the instrument during its operative periods. The gears 116a and 117a are positioned out of engagement when the tape 114 is maintained in a tensioned condition by virtue of the displaced position of the rotors of synchros 111 and 112. In addition, the solenoid 120 during operation of the synchro system is energized thereby holding the cam follower roller 129 out of engagement with the cam 130.

While there has been shown and described several embodiments of the invention, it should be appreciated that other modifications may be made to the manner in which the tape and the two synchroreceivers are arranged as long as the synchros support and drive the readout tape in the instrument. The power requirements of the tape tensioning and drive have heretofore been such that the use of a synchro alone without any servo amplifier or other power assisting means was impractical from the standpoint of obtaining accurate readings. The tape-type instrument utilizing two standard synchroelements is low in cost and provides high accuracy with little likelihood of malfunctioning.

What is claimed to be new and desired to be secured by Letters Patent of the U.S. is:

1. A linear-tape-type instrument comprising an elongated tape having suitable indicia inscribed thereon, a linear scale disposed adjacent to said tape and adapted to cooperate with said indicia, drive means for said tape comprising a pair of synchrotorque receivers having rotors connected to opposite ends of said tape, a synchrotransmitter having its field connected in parallel to the fields of said synchrotorque receivers in order to rotate the rotors of said torque receivers, means connecting the rotors of said synchrotransmitter and said synchroreceivers to a common alternating current source, and adjustable means for connecting said tape to said synchroreceiver rotors to hold said rotors angularly displaced from their null positions thereby producing a tensioning force on said tape.

2. The instrument of claim 1 including frame means for mounting said synchrotorque receivers in spaced relation to each other, said synchrotorque receivers being adjustably mounted on said frame means so that said torque receivers may be rotated about their axes to offset said rotors with respect to said null positions and thereby creating a tensioning force on said tape.

3. The instrument of claim 2 including synchronizing means operating on said synchrotorque receivers when said instrument is deenergized to retain said torque receiver rotors in a constant relative angular position during deenergization.

4. The instrument of claim 3 wherein said synchronizing means comprises a pair of gears one of which is mounted on the shaft of each of said torque receiver rotors, said gears having overlapping gear teeth which are spaced from each other and out of engagement when said instrument is energized but move into engagement when said instrument is deenergized.

5. The instrument of claim 3 wherein said synchronizing means comprises a solenoid mechanism which is drivingly connected to a cam follower mechanism, a pair of cams one of which is carried by each of said torque receiver rotors, means electrically connecting said solenoid to said instrument so that said solenoid is energized along with said instrument and retains said cam follower mechanism out of engagement with said cams while it is energized, spring means biasing said cam follower mechanism into engagement with said cams when said solenoid is deenergized, said solenoid and said cam follower mechanism urging said rotors to preselected positions when said instrument is deenergized.

6. An instrument comprising a readout scale unit having a stationary part and a movable part, one of said parts including a display scale having uniformly spaced graduations, the other of said part including an indicator, said movable part being mounted for movement along and in indicating relationship with said stationary part to provide an instrument reading at the intersection of said display scale and said indicator, said movable part including an elongated readout tape, one end of said tape attached to the rotor of a first synchroreceiver unit and the other end of said tape attached to the rotor of a second synchroreceiver unit, a synchrotransmitter unit, means for electrically connecting the rotors of said transmitter and said receiver units to an AC power source, means for electrically connecting the field windings of said transmitter unit with the field winding of both of said receiver units, and means for offsetting said rotors of said receiver units from their null positions in equal amounts and in opposite directions to provide a constant tension force of equal and opposite directions on said ends of said tape.

7. An instrument as defined in claim 6, further comprising a means for automatically rotating said rotors of said receiver units to the same angular starting position upon said AC power source becoming deenergized.

8. An instrument as defined in claim 6, wherein said offsetting means comprises said field windings of said synchroreceiver units offset through an equal but opposite angular orientation from the angular position in which said tape is taut and said receiver unit rotors are in their null positions.

9. An instrument as defined in claim 6 including means for synchronizing the rotation of said receiver unit rotors when said instrument has been deenergized, said means for synchronizing comprising a pair of gears mounted for rotation with each of said receiver unit rotors, said gears having teeth which are overlapping but spaced from each other when said instrument is energized and operating, said overlapping teeth moving into engagement upon deenergization of said instrument to prevent any substantial relative rotation between said receiver unit rotors.

10. In an instrument of the readout tape indicator type the method of tensioning the readout tape with a constant force comprising the steps of attaching the opposite ends of said readout tape to the rotors of first and second synchroreceiver units, electrically connecting each field winding of said first and second synchroreceiver units to each field winding of a synchrotransmitter electrically connecting the rotor windings of said transmitter unit and said first and second receiver units to an AC power source, and offsetting said field windings of said receiver units with respect to said transmitter's field windings in equal amounts and in opposite directions to provide the desired tape tension in said readout tape by having said receiver rotors held by said tape in displaced positions with respect to their null positions.

11. The method of tensioning the readout tape as defined in claim 10, further comprising the step of automatically returning said rotors of said receiver units to starting positions in response to said AC power source being removed.

* * * * *